(12) United States Patent
Ikeda

(10) Patent No.: US 6,233,103 B1
(45) Date of Patent: May 15, 2001

(54) HOUSING STRUCTURE FOR FIXEDLY HOLDING LENS ARRAY

(75) Inventor: Makoto Ikeda, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/461,950

(22) Filed: Dec. 15, 1999

(30) Foreign Application Priority Data

Dec. 15, 1998 (JP) .................................................. 10-356615

(51) Int. Cl.[7] ...................................................... G02B 7/02
(52) U.S. Cl. ............................ 359/819; 359/821; 359/808
(58) Field of Search .................................. 359/819, 821, 359/808

(56) References Cited

U.S. PATENT DOCUMENTS 4,059,345 * 11/1977 Kawamura et al. .................. 359/819
4,961,802 * 10/1990 Otsuki et al. ......................... 156/153

FOREIGN PATENT DOCUMENTS

| 362171374 | * | 7/1987 | (JP) | ................ H04N/1/028 |
| 363080669 | * | 4/1988 | (JP) | ................ H04N/1/04 |
| 404261506 | * | 12/1992 | (JP) | ................ G02B/7/00 |
| 8-220645 | | 8/1996 | (JP) . | |
| 409238227 | * | 9/1997 | (JP) | ................ G02B/3/00 |

* cited by examiner

Primary Examiner—Georgia Epps
Assistant Examiner—Saeed Seyrafi
(74) Attorney, Agent, or Firm—Merchant & Gould P.C.

(57) ABSTRACT

A housing structure for fixedly holding an elongate lens array of rectangular cross section comprises an elongate groove extending along the length of the housing structure and having a width and a depth corresponding to a sectional height and width of the lens array so that the lens array can be fitted therein, and at least one protrusion of thermoplastic resin provided at an open edge extending along the groove to thereby partly define the groove. The protrusion is deformed to radially spread over part of the lens array. As a result, the lens array can be fixedly held in the groove.

10 Claims, 5 Drawing Sheets

HOUSING STRUCTURE FOR FIXEDLY HOLDING LENS ARRAY

BACKGROUND OF THE INVENTION

1. Field of the Invention

The present invention relates to an improved housing structure for fixedly holding a lens array for use in an optical reader or the like.

2. Description of the Related Art

In recent years, optical readers employ an element called a rod lens array. An example arrangement of such a rod lens array is disclosed in, for example, Japanese Patent Laid-Open Publication No. HEI-8-220645 entitled "STRUCTURE FOR FIXEDLY HOLDING A ROD LENS ARRAY FOR USE IN OPTICAL READER". The disclosed rod lens array comprises a plurality of columnar distributed index lenses made from a transparent material such as glass and plastics, arranged side by side in a row and then fixed by means of a resin. Thus, the array is elongate and has a rectangular cross section. In use, the array is held in a holder or a housing.

More specifically, the rod lens array is fitted in a U-shaped recess or groove formed in the holder and fixedly held therein by filling a space between a right wall defining part of the groove and a right wall of the lens array with a silicone resin and filling a space between a left wall of the groove and a left wall of the lens array with an acrylic resin.

Due to its flexibility, silicone resin is often used in this field of technology. However, it requires at least 30 minutes for the resin to become hardened. When complete hardening or setting needs to be assured, the resin should be allowed about 60 minutes to harden. During hardening of the resin, the rod lens array must be held immovably by means of an appropriate jig or clamp. This operation is tedious and time consuming, thereby making it difficult to achieve the desired increase in productivity.

To this end, there has been proposed as an adhesive a silicone-based resin which becomes hardened by ultraviolet rays in a shortened period of time. However, the proposed resin not only is expensive but also requires installations for producing unltraviolet rays, thereby increasing the cost of production of the end product.

SUMMARY OF THE INVENTION

It is therefore an object of the present invention to provide a housing structure to which a rod lens array can be fixedly secured quickly.

According to an aspect of the present invention, there is provided a housing structure for fixedly holding an elongate lens array of rectangular cross section, which housing structure comprises an elongate U-shaped groove extending along the length of the housing structure and having a width and a depth corresponding to a sectional height and width of the lens array so that the lens array can be fitted therein, and at least one protrusion of thermoplastic resin provided at an open edge extending along the groove to thereby partly define the groove. The protrusion is thermally deformed to radially spread over part of the lens array so that the lens array can be fixedly held in the groove.

With this arrangement, it is no longer necessary to keep holding the lens array until an adhesive solidifies as required in the conventional arrangement. Consequently, after a short period of time for deforming the protrusion, the housing structure with the lens array fixedly housed therein can be passed to a succeeding process, thereby increasing the productivity.

Desirably, the protrusion comprises two protrusions of thermoplastic resin provided at opposite ends of the open edge.

The housing structure may be wholly made of a thermoplastic resin.

The lens array may comprise a rod lens array having a plurality of columnar distributed index lenses arranged side by side in a row and integrally fixed by means of a resin.

In a preferred form, the spread-over part of the protrusion is obtained by heating, press smashing and air cooling it by using a resin welder.

Preferably, the housing structure further comprises at least one cutout provided in the open edge for allowing access to a corner where a side surface of the lens array and a bottom surface of the cutout meet, and an adhesive applied to the corner for connecting together the lens array and the cutout bottom surface. The adhesive adds up the firmness of connection of the lens array to the housing structure, thereby increasing the reliability of the latter.

The adhesive may comprise a silicone-based adhesive.

It is desirable that the adhesive is applied by means of an adhesive gun accessed through the cutout.

The adhesive may be oval or semi-circular in shape when applied.

BRIEF DESCRIPTION OF THE DRAWINGS

A preferred embodiment of the present invention will hereinafter be described in detail, by way of example only, with reference to the accompanying drawings, in which.

DETAILED DESCRIPTION OF THE PREFERRED EMBODIMENT

The following description is merely exemplary in nature and is in no way intended to limit the invention or its application or uses.

Figure 1:
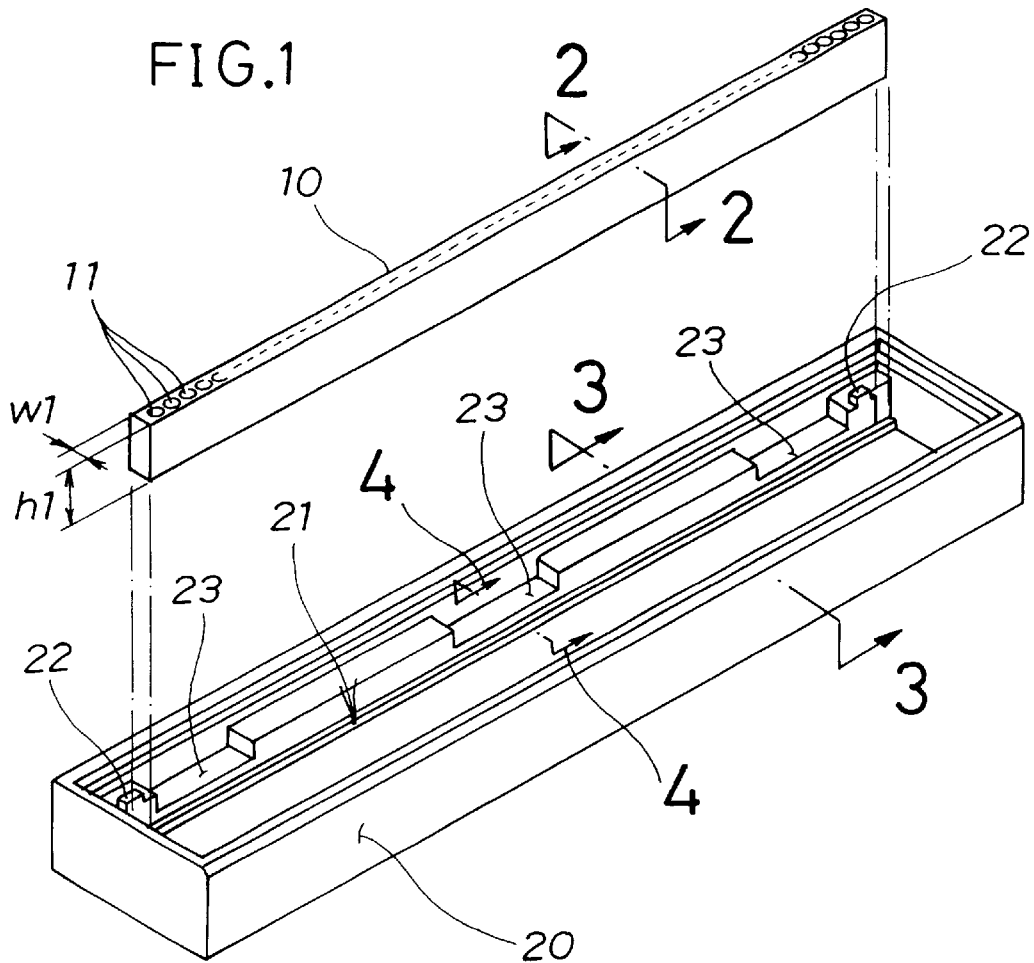
FIG. 1 is a perspective view illustrating a lens array and a housing structure for receiving the array according to the present invention.
Figure 2:
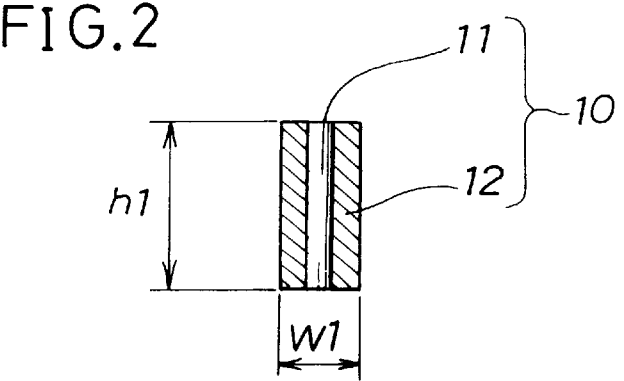
FIG. 2 is a cross-sectional view taken along line 2—2 of FIG. 1.

As shown in FIGS. 1 and 2, a lens array 10 as an optical element comprises a plurality of columnar lenses 11 arranged side by side in a row and fixed integrally by means of a resin 12 such that it becomes elongate and has a rectangular cross section. More specifically, the array 10 has a sectional height of h1 and a sectional width of w1. In the embodiment being described, the sectional height h1 is several millimeters (mm) while the sectional width w1 is of the order of 0.1 mm. Thus, the array is a quite small optical element.

Housing structure 20 for housing the lens array 10 is made from a resin material and has an elongate U-shaped groove 21 for receiving the lens array 10, protrusions 22, 22 rising from end portions of the groove 21 and at least one cutout 23 (three in the illustrated example) extending along an edge of or a wall partly defining the groove 21. One cutout 23 may be good for the intended purpose but the number may be arbitrarily increased depending on the length of the lens array 10.

Figure 3:
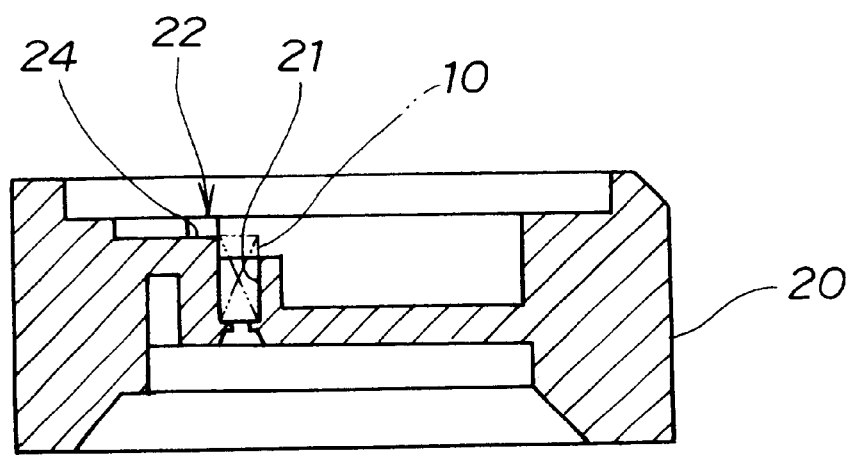
FIG. 3 is a cross-sectional view taken along line 3—3 of FIG. 1.

As can be appreciated from FIG. 3, the U-shaped groove 21 of the housing structure 20 has a width and a depth which allow reception of the lens array 10 as shown by a phantom line. Each protrusion 22 projects upwardly from an open edge 24 of the groove 21. The protrusion 22 is in the form of a column of a thermoplastic resin (e.g., polycarbonate resin) and has a height of about 0.5 mm, a length of about 1 to 3 mm and a width of about 0.5 to 1.0 mm.

For reason explained below, each protrusion 22 needs to be thermally deformed and hence is required to be made from a thermoplastic resin. Other portions of the housing structure 20 do not necessarily need to be made from a thermoplastic resin. The housing structure 20 may be wholly made from a thermoplastic resin. Alternatively, only the protrusion 22 may be made from a thermoplastic resin while the rest of the housing structure 20 is made from a thermosetting resin or metal.

Figure 4:
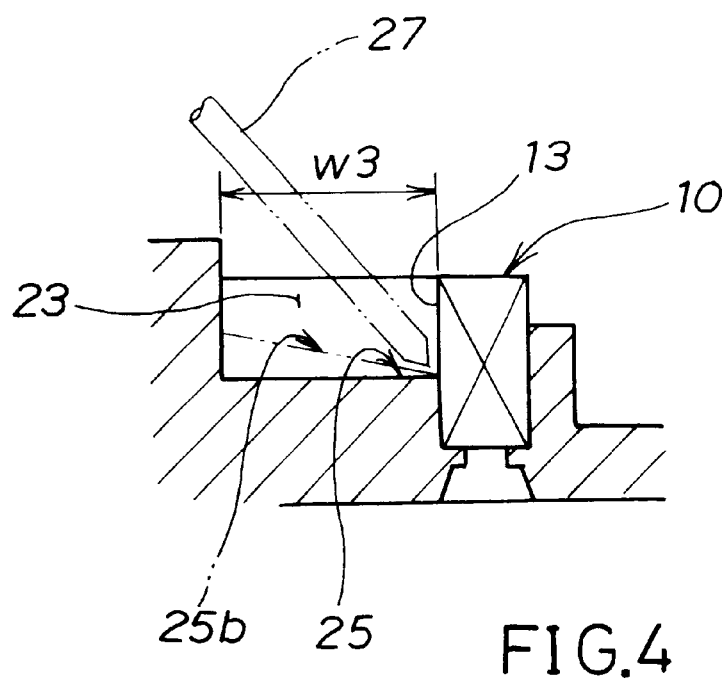
FIG. 4 is an enlarged cross-sectional view taken along line 4—4 of FIG. 1.

Turning now to FIG. 4, a surface 25 defining a bottom of the cutout 23 lies to meet a side surface 13 of the lens array 10. The cutout-bottom-defining surface 25 may desireably be positioned at such a lower level that it meets a heightwise central part of the side wall 13. Width w3 of the cutout 23 is dimensioned to receive an adhesive gun 27 shown by a phantom line.

The bottom surface 25 may be altered to an inclined one 25b as indicated by a phantom line so that an adhesive can flow down along the surface 25b and be kept between the surface 25b and the side surface 13. When the bottom surface 25 is arranged to lie horizontally, there is a fear that the adhesive will spread over the surface 25, thus requiring use of a less flowable, relatively hard adhesive. In contrast, where the inclined surface 25b is employed in its stead, no problem will arise from the use of an adhesive of high flowability. This increases the freedom of choice of adhesives. In addition, since an angle formed by the inclined surface 25b and the side surface 13 becomes acute (less than 90 degrees), a more tightly fitted arrangement can be achieved compared to when it is right-angled.

Figure 5:
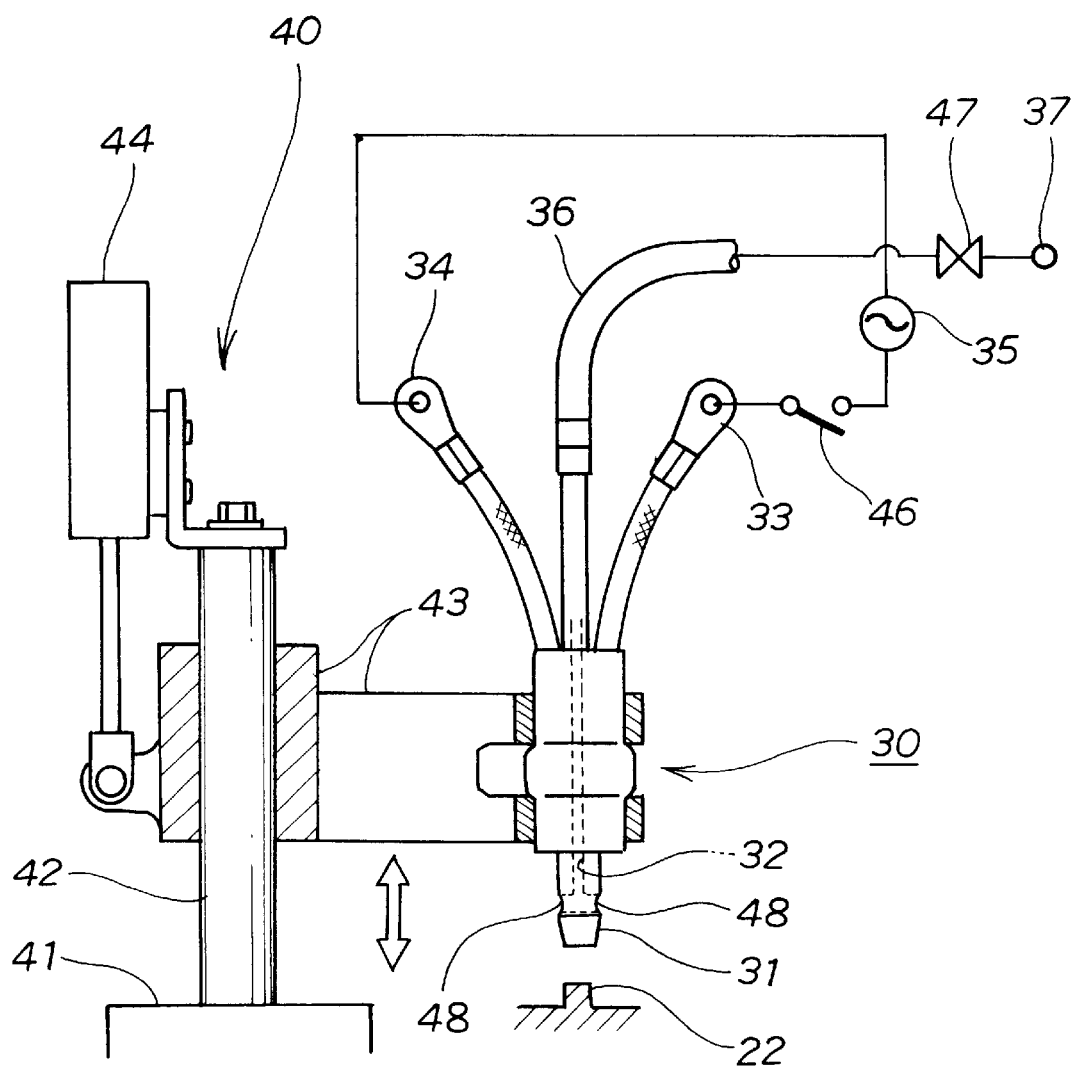
FIG. 5 is a schematic view illustrating the principle of a resin welder for use in the present invention.

Reference is made next to FIG. 5 illustrating the principle of a resin welder 30, a jig designed for effecting resin thermal bonding or resin welding. The resin welder 30 performs three different functions, namely, to soften a resin by heating the same to above a melting point thereof, to press smash the resin into a desired shape and immediately thereafter to forcedly air cool the resin to make the same solidify. The resin welder 30 comprises a welder tip 31 for blowing air fed from a source of pressurized air 37 through a tube 36 and via an air passage 32, and a heating element built therein but not shown and fed with electrical power from a power source 35 via electrical terminals 33, 34 to heat the welder tip 31 for a reason explained below.

The resin welder 30 may be operated manually. However, it is more desirable that the resin welder 30 is mounted to an appropriate welder elevating mechanism 40 so as to increase operation efficiency and to achieve the desired final precision. To this effect, the welder elevating mechanism 40 comprises a guide rod 42 extending vertically from a base 41, an elevating arm 43 vertically movably supported by the guide rod 42, and a cylinder unit 44 for vertically moving the elevating arm 43 so that the resin welder 30 attached to the arm 43 can be vertically moved with high precision. The cylinder unit 44 may comprise a stepping cylinder so that the distance of movement of the arm 43 can be controlled with high precision.

By appropriately turning on a switch 46, the welder tip 31 is heated to a predetermined temperature to thereby heat and soften the protrusion 22, whereafter the cylinder unit 44 is actuated to press smash the protrusion 22. Otherwise, the switch 46 is turned off and thereafter a valve 47 is opened to cause cold air to blow through the air passage 32 out from air outlets 48, 48 to thereby forcedly cool the welder tip 31. The protrusion 22 is cooled indirectly by the thus cooled welder tip 31 as well as by the air blown out from the air outlets 48, 48.

Figure 6A:
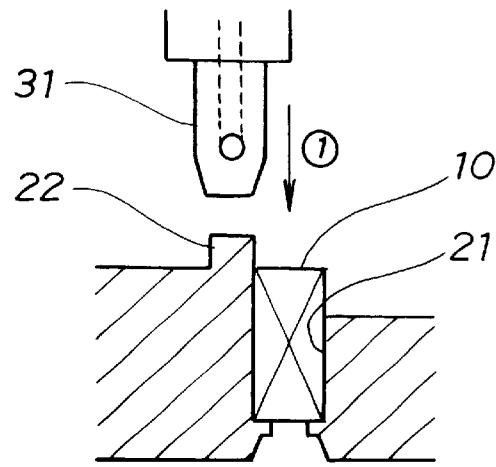
FIGS. 6A through 6C are schematic views illustrating how a protrusion is thermally deformed.
Figure 6B:
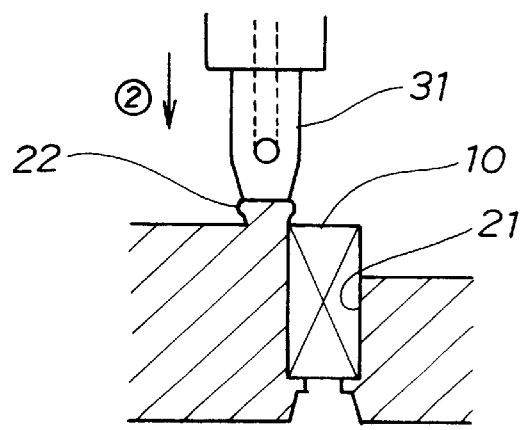
Figure 6C:
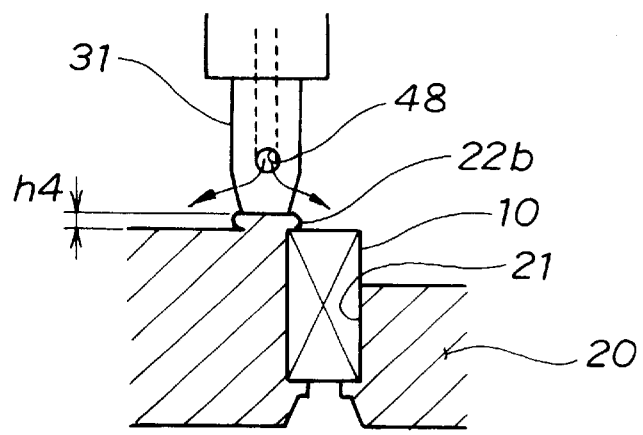

Discussion will be made next as to the method for fixing the lens array by using resin welder as explained above, with reference to FIGS. 6A to 6C illustrating operations for thermally deforming the protrusion.

Firstly, the lens array 10 is fitted in the groove 21 as shown by arrow (1).

Next, the welder tip 31 heated to a predetermined temperature is brought into pressed contact with the protrusion 22. The protrusion 22 soon reaches a softening point and becomes softened. Then, the welder tip 31 is lowered as shown by arrow (2) to make the protrusion 22 become flattened.

Continuously, the protrusion is press smashed until its final height h4 becomes 30 to 50% of its initial height, e.g., 0.2 mm. As a result, part of the protrusion 22b radially spreads or sticks out to cover part of an upper surface of the lens array 10. After this deformation, air is blown out from the air outlet 48 at the deformed protrusion 22b to make the latter solidify. By virtue of the radially spread part of the protrusion 22b, the lens array 10 fitted in the groove 21 is fixedly secured to the housing structure 20 and does not come off upon unexpected application of vibrations to the structure.

When the protrusion 22 is made of polycarbonate and has dimensions of 0.8 mm (width)×1.5 mm (length)×0.5 mm (height), time required for heating the protrusion is about 0.5 to 1.0 sec. while time required for softening and press smashing the protrusion is about 0.5 to 1.0 sec. Time required for cooling the protrusion is about 1.0 to 1.5 sec.

Figure 7:
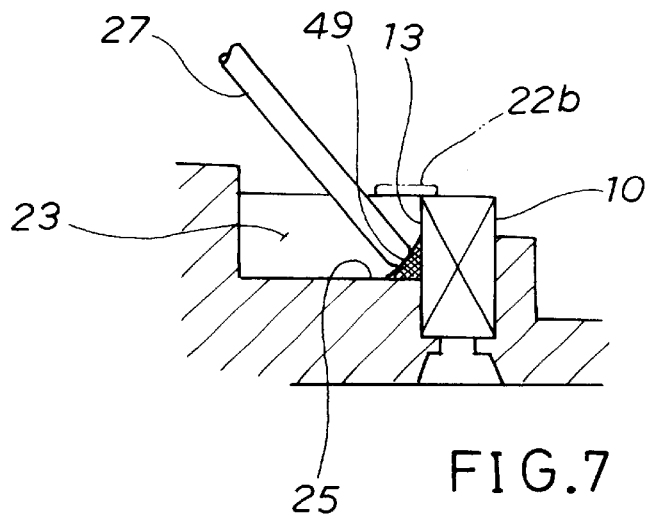
FIG. 7 is a schematic view illustrating how an adhesive is applied.

As shown in FIG. 7, the lens array 10 is stably held by the protrusion 22b indicated by a phantom line. Then, the adhesive gun 27 is inserted into the cutout 23 and operated to apply a silicone-based adhesive 49 to a corner where the cutout-bottom-defining surface 25 and the lens array side surface 13 meet.

Operation to make the adhesive 49 solidify may be carried out independently of the radial spreading of the protrusion 22b. Thus, the adhesive 49 may be left as it is for about 30 to 60 minutes until it solidifies.

As explained above, since the protrusion radial spreading and the adhesive application can be effected in such efficient manners as illustrated respectively in FIGS. 6 and 7, the resulting housing structures can be immediately passed to a succeeding adhesive solidifying step where they may be left as they are in a large space. Thus, the adhesive solidifying step does not interrupt in any way the thermal radial spreading and the adhesive application, thereby enabling significant increase in the productivity.

Figure 8:
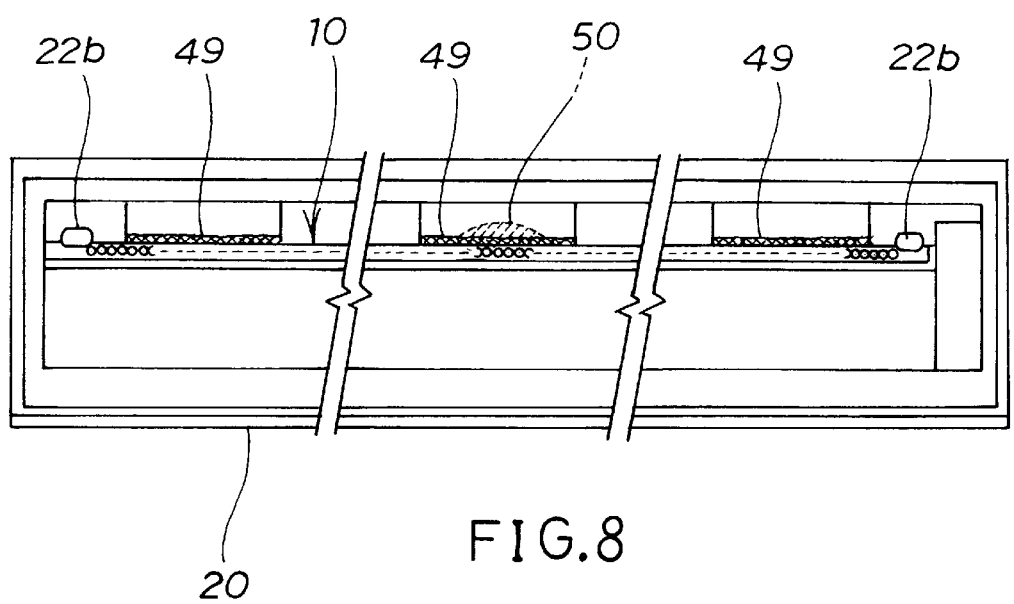
FIG. 8 is a top plan view illustrating the housing structure and the lens array fixedly held therein.

FIG. 8 illustrates, in top plan, the housing structure 20 with the lens array 10 fitted therein. The lens array 10 is held immovable by the right and left protrusions 22b, 22b. In addition, it is fixedly secured to the housing structure 20 by means of the adhesives 49, 49, 49. The lens array 10 can be fixed only by the protrusions 22b, 22b. However, it may happen that the protrusions come off by vibrations or the like exerted thereto, in which instance the adhesives 49, 49, 49 will keep the lens array in place. In this sense, application of the adhesives is effective and desired as auxiliary holding means. The adhesives 49 may be applied ovally or semi-circularly as at 50. This renders the relevant operation easy.

The lens array 10 is an optical element employed in a precision device. Thus, wrong positioning of the lens array 10 will affect the general precision of an associated optical mechanism. Consequently, precisely securely fixing the lens array 10 to the housing structure in accordance with the present invention is quite meaningful. In this respect, the principle of this invention can be applied to any optical elements as far as they are elongate and rectangular in cross section and should not be construed as being limited to such applications as lens arrays or rod lens arrays discussed herein.

Obviously, various minor changes and modifications of the present invention are possible in the light of the above teaching. It is therefore to be understood that within the scope of the appended claims, the present invention may be practiced otherwise than as specifically described.

What is claimed is:

1. A housing structure for fixedly holding an elongate lens array of rectangular cross section, said housing structure comprising:

an elongate U-shaped groove extending along the length of said housing structure and having a width and a depth corresponding to a sectional height and width of the lens array so that the lens array can be fitted therein;

at least one protrusion of thermoplastic resin provided at an open edge extending along said groove to thereby partly define said groove; and said protrusion being deformed to radially spread over part of the lens array so that the lens array can be fixedly held in said groove.

2. A housing structure according to claim 1, wherein said protrusion comprises two protrusions of thermoplastic resin provided at opposite ends of said open edge.

3. A housing structure according to claim 1, wherein said housing structure is wholly made of a thermoplastic resin.

4. A housing structure according to claim 1, wherein said lens array comprises a rod lens array having a plurality of columnar distributed index lenses arranged side by side in a row and integrally fixed by means of a resin.

5. A housing structure according to claim 1, wherein the spread-over part of said protrusion resulted from heating, press smashing and air cooling by a resin welder.

6. A housing structure according to claim 1, further comprising at least one cutout provided in said open edge for allowing access to a corner where a side surface of the lens array and a bottom surface of said cutout meet, and an adhesive applied to said corner for connecting together the lens array side surface and said cutout bottom surface.

7. A housing structure according to claim 6, wherein said adhesive comprises a silicone-based adhesive.

8. A housing structure according to claim 6, wherein said adhesive is applied by means of an adhesive gun accessed through said cutout.

9. A housing structure according to claim 6, wherein said adhesive is oval in shape when applied.

10. A housing structure according to claim 6, wherein said adhesive is semi-circular in shape when applied.

* * * * *